United States Patent [19]

Luz

[11] 4,223,469
[45] Sep. 23, 1980

[54] FISHING LURE

[76] Inventor: Robert J. Luz, 5006 N. Larkin St., Whitefish Bay, Wis. 53217

[21] Appl. No.: 933,151

[22] Filed: Aug. 14, 1978

[51] Int. Cl.³ .............................................. A01K 85/00
[52] U.S. Cl. ................................. 43/42.03; 43/42.31; 43/42.35; 43/42.39
[58] Field of Search ................ 43/42.02, 42.03, 42.22, 43/42.31, 42.35, 42.39, 42.47, 42.48

[56] References Cited

U.S. PATENT DOCUMENTS

| 1,200,135 | 10/1916 | Reynolds | 43/42.22 |
| 1,578,070 | 3/1926 | Buddle | 43/42.39 |
| 2,036,075 | 3/1936 | Peterson | 43/42.47 |
| 2,112,901 | 4/1938 | Anderson | 43/42.32 |
| 2,235,331 | 3/1941 | Pugh | 43/42.02 |
| 2,545,129 | 3/1951 | Zeigler | 43/42.22 |
| 2,598,012 | 5/1952 | Prieur | 43/42.47 |
| 2,598,771 | 6/1952 | Eder | 43/42.22 |
| 2,742,729 | 4/1956 | McVay | 43/42.39 |
| 2,755,592 | 6/1956 | Bocchino | 43/42.22 |
| 2,829,462 | 4/1958 | Stokes | 43/42.48 |
| 3,044,207 | 7/1962 | Dorsett | 43/42.22 |
| 3,367,057 | 2/1968 | Pond | 43/42.47 |
| 3,393,466 | 6/1968 | Le Master | 43/42.39 |
| 3,982,349 | 9/1976 | Hills | 43/42.39 |
| 4,098,017 | 7/1978 | Hall | 43/42.39 |

*Primary Examiner*—Nicholas P. Godici
*Assistant Examiner*—K. Bradford Adolphson
*Attorney, Agent, or Firm*—Michael, Best & Friedrich

[57] ABSTRACT

A fishing lure having a body member, a treble hook fastened to the body member, and a flap member pivotally connected to the nose portion of the body member. The nose portion of the body member is comprised of upper and lower substantially flat surfaces which intersect along a substantially horizontal straight line at the front most edge of the nose. The flap member is comprised of a forwardly extending flat bill portion and a pair of flat arm portions extending rearwardly from the side edges of the bill portion. The flat arm portions are pivotally connected to the nose of the body member.

3 Claims, 6 Drawing Figures

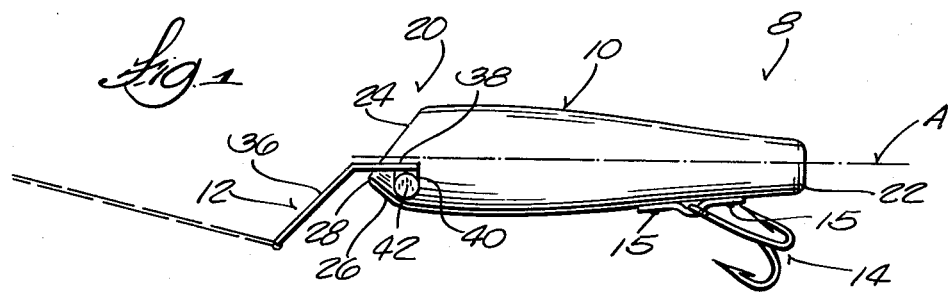
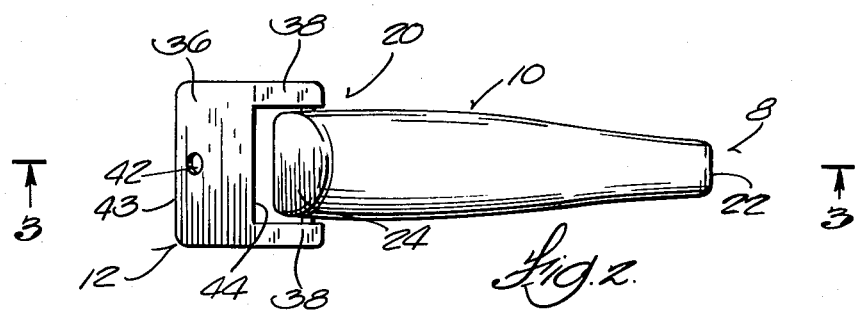
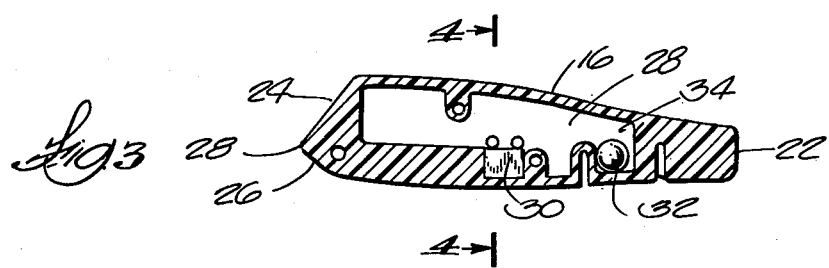
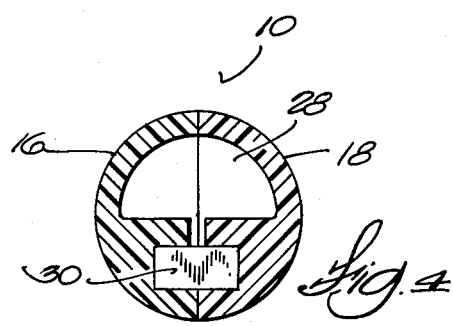

FISHING LURE

BACKGROUND OF THE INVENTION

I. Field of the Invention

This invention relates to fishing lures.

II. Description of the Prior Art

Prior art U.S. patents known to Applicant which relate generally to the subject matter of this application are as follows:

Steenstrup—U.S. Pat. No. 1,600,653
Kaste—U.S. Pat. No. 2,507,908
Maddux—U.S. Pat. No. 2,523,536
Simmons—U.S. Pat. No. 2,565,099
Kuslich—U.S. Pat. No. 2,775,839
Higdon—U.S. Pat. No. 2,852,881
Lemon—U.S. Pat. No. 3,153,298
Weimer—U.S. Pat. No. 3,279,117
Lahtinen—U.S. Pat. No. 3,412,500
Borton—U.S. Pat. No. 3,570,166
Monchil—U.S. Pat. No. 3,902,267

SUMMARY OF THE INVENTION

A fishing lure including a body member having a nose portion and a tail portion. The nose portion is comprised of upper and lower substantially flat surfaces which intersect along a substantially straight line at the front most edge of the nose. The upper surface is larger than the lower surface. A treble hook assembly is fastened to the underside of the body. A flap member is pivotally connected to the nose of the body member. The flap member is comprised of a forwardly extending flat bill portion and a pair of flat arm portions which extend rearwardly from the side edges of the bill portion. The flap member includes connector means for pivotally connecting the arm portions thereof to the body. The bill portion of the flap member has an opening therein for connection to a fishing line.

DESCRIPTION OF THE DRAWINGS

FIG. 1 is a side elevation view of a fishing lure made in accordance with the present invention;

FIG. 2 is a top plan view of the fishing lure shown in FIG. 1;

FIG. 3 is a sectional view taken along line 3—3 of FIG. 2;

FIG. 4 is a sectional view taken along line 4—4 of FIG. 3; and

DESCRIPTION OF THE PREFERRED EMBODIMENT

Figure 5:
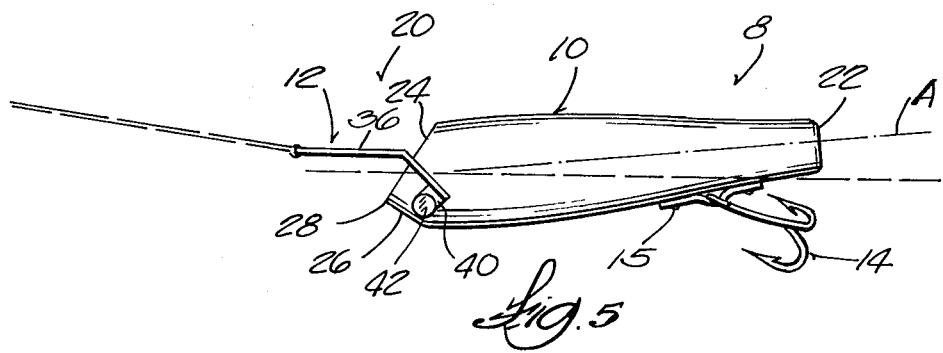
FIGS. 5 and 6 are side elevation views similar to FIG. 1 except showing the lure in different positions relative to the horizontal to show the action of the lure as it moves through the water.

Referring to the drawings in detail, the fishing lure of the present invention is designated by reference numeral 8 and is comprised of three basic parts, namely, a body member 10, a flap member 12 pivotally mounted on the front portion of the body, and a hook assembly 14 attached to the underside of the rear portion of the body. In the preferred embodiment hook assembly is attached to body 10 by a pair of self-taping screws 15.

Body member 10 is of two-piece construction comprising half-sections 16,18 as best shown in FIG. 4. Externally the assembled body member 10 is of a substantially circular cross section the diameter of which decreases gradually from the nose portion 20 to the tail portion 22. In the preferred embodiment, sections 16,18 of body 10 are made of ABS plastic material.

Nose portion 20 is in the form of two substantially flat surfaces 24 and 26 which intersect along a substantially straight edge 28 at the front of body 10. Surface 24 is larger relative to surface 26 and extends at an angle of approximately 50° with respect to the horizontal axis A of the lure as shown in FIG. 1. The smaller surface 26 extends at an angle of approximately 35° with respect to axis A and the edge 28 between surfaces 24 and 26 lies a short distance below the axis A as also shown in FIG. 1. The included angle between surfaces 24 and 26 is approximately 85°.

Referring to FIG. 3, the body 10 of the lure (comprising half sections 16 and 18) has an internal cavity 28 in which a stabilizer weight member 30 is mounted. Weight member 30 is made of lead or other suitable material and is mounted in the central lower portion of the cavity 28. The function of weight 30 is to provide the required weight for effective casting with a fishing rod and reel and to lower the overall center of gravity of the lure to thereby stabilize its action as it is retrieved through the water by the fisherman.

The lure can be made to sink by adding a second weight 32. In the preferred embodiment weight 32 is in the form of a lead ball loosely captured in a compartment 34 at the rear end of cavity 28. The lure can be made in the form of a "floating" type lure by simply eliminating both weight members 30 and 32.

Flap member 12 is comprised of a relatively large bill portion 36, a pair of spaced arm portions 38,38 extending from the outer edge portions of bill portion 36 and a pair of mounting ears 40,40 extending downwardly at right angles from arms 38. The included angle between the plane of bill portion 36 and the plane of arm portions 38 is approximately 135°. In the preferred embodiment flap member 12 is made of a stainless steel stamping with bill 36, arm portions 38 and ears 40 formed integrally with each other.

Flap member is freely pivotally mounted on the nose portion 20 of body 10 by a pin member 42. Pin 42 in the preferred embodiment is in the form of a stainless steel rivet and it extends through aligned openings in ears 40 and aligned openings in the half sections 16,18 of body 10. Bill portion 36 is provided with an opening 42 for connecting the lure to the end of a fishing line. Opening 42 is located in the center of bill portion closely adjacent the leading edge 43 thereof.

The location of the pivotal connection between flap member 12 and body 10 is important. As shown in FIG. 1 the pivotally connection is located below the horizontal axis A of body 10 and slightly forward of the rear most portion of nose face 24.

Figure 6:
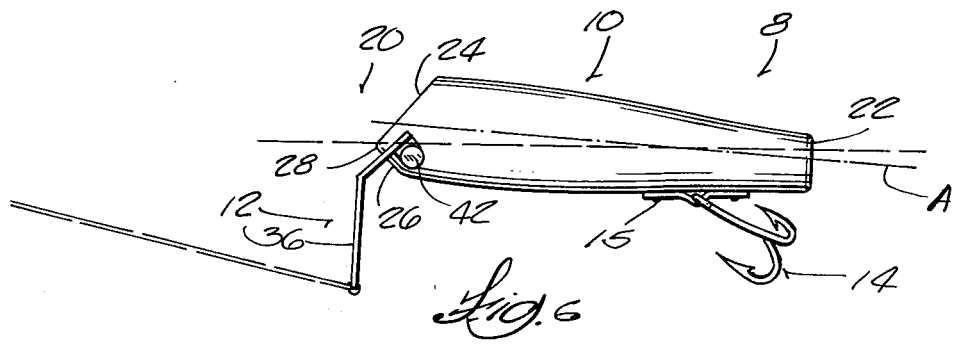

The "action" or hydrodynamic movement of the lure in the water when it is pulled through the water by trolling or retrieving with a casting rod and reel can best be explained by reference to FIGS. 1, 5 and 6.

Assume for purposes of explanation that a "floating" type lure (no weight members 30 or 32) is to be used with a conventional spin casting rod and reel. The lure is casted out by the fisherman and will land on the surface of the water. If the lure is allowed to remain idle in the water it will float. When the lure is retrieved it will initially dive downwardly in the water to a depth of approximately 4–5 feet below the surface at which level it will level off for the balance of the retrieve. The depth to which it will dive before leveling off will depend primarily on the speed of the retrieve.

As the lure is retrieved through the water at any given level the flap member 12 will pivot with respect to body 10 and at the same time the body 10 will move up and down in what can best be described as a vertical rocking movement. More specifically, the extreme upper pivotal position of flap member 12 is shown in FIG. 5 and the extreme lower pivotal position of flap member 12 is shown in FIG. 6. The FIG. 1 position of flap member 12 is an intermediate position. It will be noted that the extreme upper pivotal position of flap 12, as shown in FIG. 5, is limited by the physical contact between the edge 44 of bill portion 36 with the face 24 on body 10. The extreme lower pivotal position of flap member 12, as shown in FIG. 5, is determined by the hydrodynamic forces acting on the lure.

To summarize, the overall action of the lure is a combination of a rapid pivotal up and down movement of flap member 12 with a simultaneous rapid up and down rocking movement of the body 10. Such rapid combination of pivotal and rocking motions will be "continuous" as the lure is retrieved or trolled through the water. Experience has shown that the vibrations produced by the pivotal movement of flapper 12 together with the rocking up and down movement of body 10 combines to produce an effective game fish lure.

Referring now to the "sinking" version of the lure requiring the provision of the extra weight members 32 and 30, such sinking type lure when cast out by the fisherman is allowed to sink (tail first) to the desired depth. It is then retrieved at such depth. The action of the "sinking" version of the lure as it is retrieved through the water at the desired depth is very similar to that of the "floating" version as described above. The weight 34 loosely captured in compartment will "rattle" therein as the lure is retrieved to thereby send out additional sound waves through the water.

I claim:
1. A fishing lure comprising:
a body member having a longitudinal axis and a nose portion and a tail portion, said nose portion comprising upper and lower flat surfaces which intersect along a straight line at the front most edge of the nose portion, said upper surface being larger than said lower surface;
a hook fastened to the underside of said body member;
a flap member pivotally connected to the nose portion of said body member, said flap member comprising a flat bill portion extending forwardly from said nose portion of said body member and a pair of flat arm portions extending from the side edges of said bill portion towards said nose portion of said body portion, said flap member further including connector means for pivotally connecting said arm portions to said nose portion of said body member, said bill portion having an attachment means therein located adjacent the leading edge thereof to facilitate attachment of the lure to a fishing line, said pivotal connector means between said arm portions of said flap member and said nose portion of said body member being located below the longitudinal axis of said body member, said flap member being further characterized by having an included angle between the plane of said bill portion and the plane of said arm portions of 135°,

2. A fishing lure according to claim 1 in which said upper flat surface of said nose portion extends at an angle of 50° with respect to the longitudinal axis of said body member.

3. A fishing lure according to claim 2 in which said lower flat surface of said nose portion extends at an angle of 35° with respect to the longitudinal axis of said body member and the included angle between said upper and lower flat surfaces is 85°.

* * * * *